UNITED STATES PATENT OFFICE.

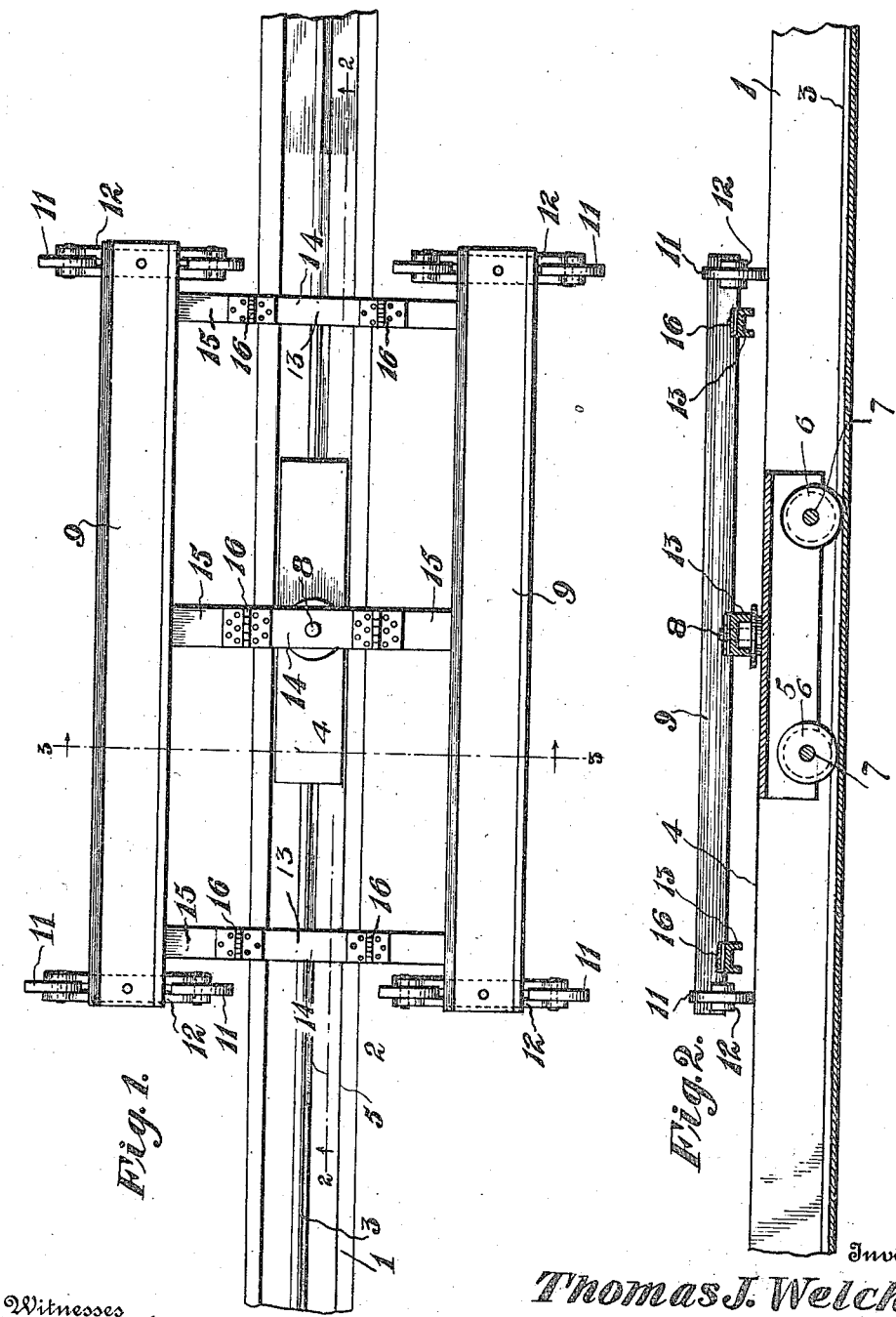

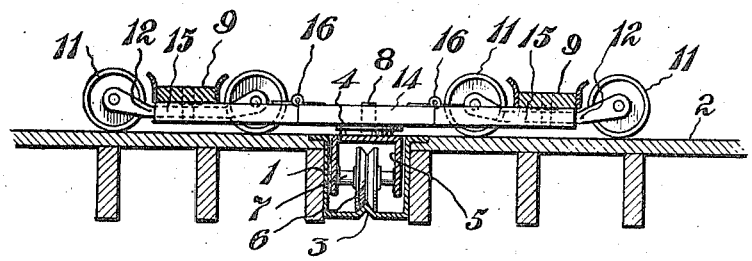
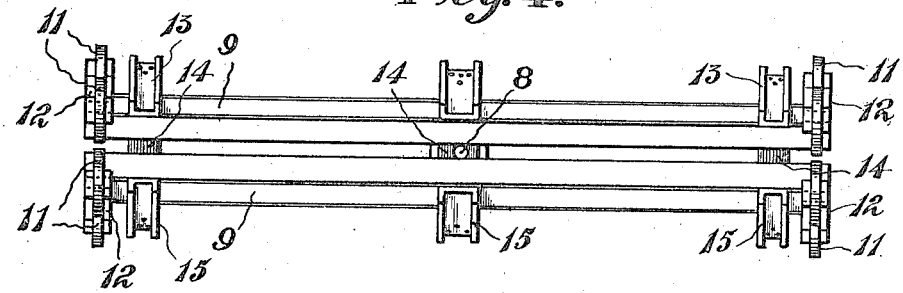
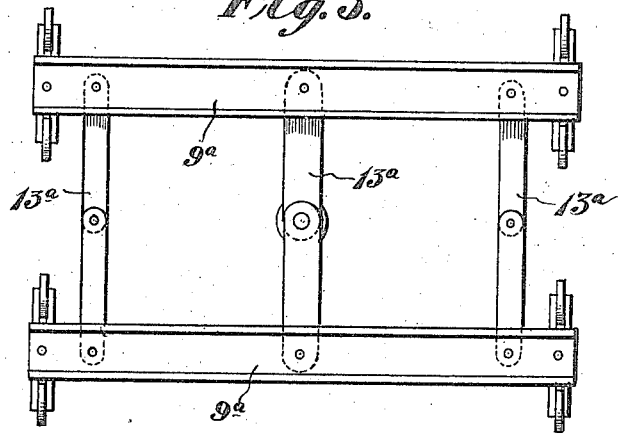

THOMAS J. WELCH, OF DELPHOS, OHIO.

AUTOMOBILE TURN-TABLE.

1,249,263.

Specification of Letters Patent.   Patented Dec. 4, 1917.

Application filed April 4, 1917.   Serial No. 159,842.

*To all whom it may concern:*

Be it known that I, THOMAS J. WELCH, a citizen of the United States, residing at Delphos, in the county of Allen and State of Ohio, have invented new and useful Improvements in Automobile Turn-Tables, of which the following is a specification.

This invention is an improved automobile turntable, for use in a garage and to enable an automobile to be carried from end to end of the garage and to be also readily turned.

One object of my invention is to provide an automobile turntable which may be compactly folded and arranged out of the way when not in use.

Another object is to combine with an automobile turntable a sunken channel in the floor of a garage, and a carrier movable longitudinally in the sunken channel and on which the turntable is pivotally mounted.

A further object is to effect improvements in the construction of the turntable.

The invention consists in the features of construction, combination, and arrangement of devices, hereinafter fully described and claimed.

In the accompanying drawings,

Figure 1 is a plan of an automobile turntable constructed and arranged in accordance with my invention and showing the same extended.

Fig. 2 is a longitudinal sectional view of the same, on the plane indicated by the line 2—2 of Fig. 1.

Fig. 3 is a transverse sectional view of the same on the plane indicated by the line 3—3 of Fig. 1.

Fig. 4 is a detail plan showing the turntable folded.

Fig. 5 is a detail plan showing a modified construction of the turntable.

In the embodiment of my invention, I provide a channel track member 1, which is sunken below the floor 2 of a garage and which in practice preferably extends from end to end of the garage, the said sunken channel track member may, however, be of any suitable length. A guide rail or flange 3 is in the center of the bottom of the channel track member.

A carrier 4 is provided which is arranged in the channel track member and is adapted to be moved from end to end thereof and is here shown as comprising a channel member 5 arranged in reverse relation to the channel track member 1 and as provided with grooved supporting wheels 6 arranged, one at the center and one near each end of said carrier, provided with axles 7 and engaging and arranged to travel on the track rail or flange 3. At the center of the carrier, on its upper side is a pivot 8.

The turntable comprises a pair of track or guide members 9 which are channeled as shown to enable the wheels of an automobile to be readily arranged thereon and to retain the automobiles in place and each of the said guide members 9 is provided at its ends with supporting wheels 11 which are mounted in bearings at the ends of fork bars 12 which are secured transversely under said guide members. The guide members are connected together at their centers and near their ends by cross bars 13, each of which comprises a central member 14 and end members 15. Said central and end members of the cross bars are connected together by hinges 16 which enable the guide members 9 to be extended outwardly with their channel sides uppermost to arrange the turntable for use and the said hinge connections between the center and end members of the turntable cross bars also adapt the turntable to be folded so that the guide members 9 may be turned bottom side up and arranged near each other and caused to bear on the central members of the cross bars, thus greatly contracting the width of the turntable and enabling the same to be compactly disposed and arranged out of the way when not in use. The central member of the central cross bar of the turntable is mounted detachably on the pivot 8, so that when the turntable is extended and an automobile has been run thereon, the automobile may be carried by the turntable and the carrier 4 longitudinally of the garage to any desired point therein and may be also turned by turning the turntable as will be understood.

In Fig. 5 I show a modified form of the turntable in which the guide members 9$^a$ are connected together by flexible jointed cross bars 13$^a$ which admit of the folding and extension of the turntable.

Having described the invention, what is claimed is:

A foldable automobile turntable comprising a pair of guide members for the wheels of an automobile, supporting wheels for said guide members, and cross bars connecting said guide members, each of said cross bars comprising a central member and a pair of end members, said end members and central members being pivotally connected together so that said guide members are foldable inwardly and toward each other.

In testimony whereof I affix my signature.

THOMAS J. WELCH.

Copies of this patent may be obtained for five cents each, by addressing the "Commissioner of Patents, Washington, D. C."